United States Patent [19]
Ferraro

[11] 3,935,916
[45] Feb. 3, 1976

[54] DUAL CONTROL SYSTEM FOR MOTORCYCLE INSTRUCTION

[76] Inventor: Thomas A. Ferraro, 6 Nassau Place, Cos Cob, Conn. 06807

[22] Filed: June 10, 1974

[21] Appl. No.: 477,926

Related U.S. Application Data

[63] Continuation-in-part of Ser. No. 382,493, July 25, 1973, abandoned.

[52] U.S. Cl............. 180/33 R; 180/77 R; 280/273; 188/106 R; 74/474; 74/512; 74/479
[51] Int. Cl............................ B62l 3/04; B62k 7/00
[58] Field of Search........ 180/82 R, 77 C, 77 R, 30, 180/33 R; 280/273, 7.16, 231; 192/3 R; 74/478, 494, 512, 474, 479; 188/106 R

[56] References Cited
UNITED STATES PATENTS

| | | | |
|---|---|---|---|
| 599,859 | 3/1898 | McFadden | 280/7.16 |
| 1,274,978 | 8/1918 | Bishop | 180/77 C |
| 2,322,499 | 6/1943 | Andrews | 188/106 R |
| 2,638,175 | 5/1953 | Poulsen | 188/106 R |
| 3,299,998 | 1/1967 | Douberly | 192/3 R |

FOREIGN PATENTS OR APPLICATIONS

| | | | |
|---|---|---|---|
| 457,199 | 9/1913 | France | 180/99 |
| 1,112,848 | 3/1956 | France | 280/273 |
| 52,395 | 3/1944 | France | 280/273 |

*Primary Examiner*—Kenneth H. Betts
*Attorney, Agent, or Firm*—Alfred E. Miller

[57] ABSTRACT

A safety device particularly for motorcycle instructors having a rear seat braking control that can be operated independently of the main foot lever type motorcycle brake. In addition, a motor cut-off switch can be employed to operate simultaneously with the use of the auxiliary motorcycle brake in order to de-activate the motorcycle engine, and assist in the braking of the motorcycle. The auxiliary brake can be mounted on any motorcycle currently being manufactured and sold. The safety device takes a further form in which the instructor can steer, accelerate, and shift the motorcycle as well as braking and de-activating the engine.

7 Claims, 7 Drawing Figures

U.S. Patent  February 3, 1976  Sheet 1 of 4  3,935,916
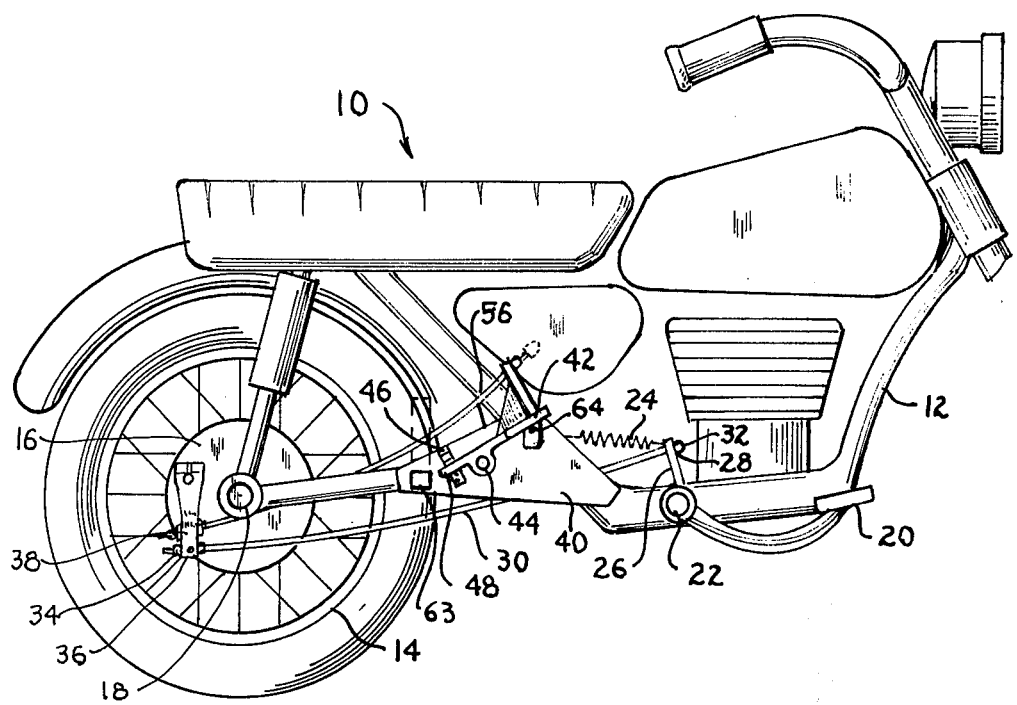
Fig. 1
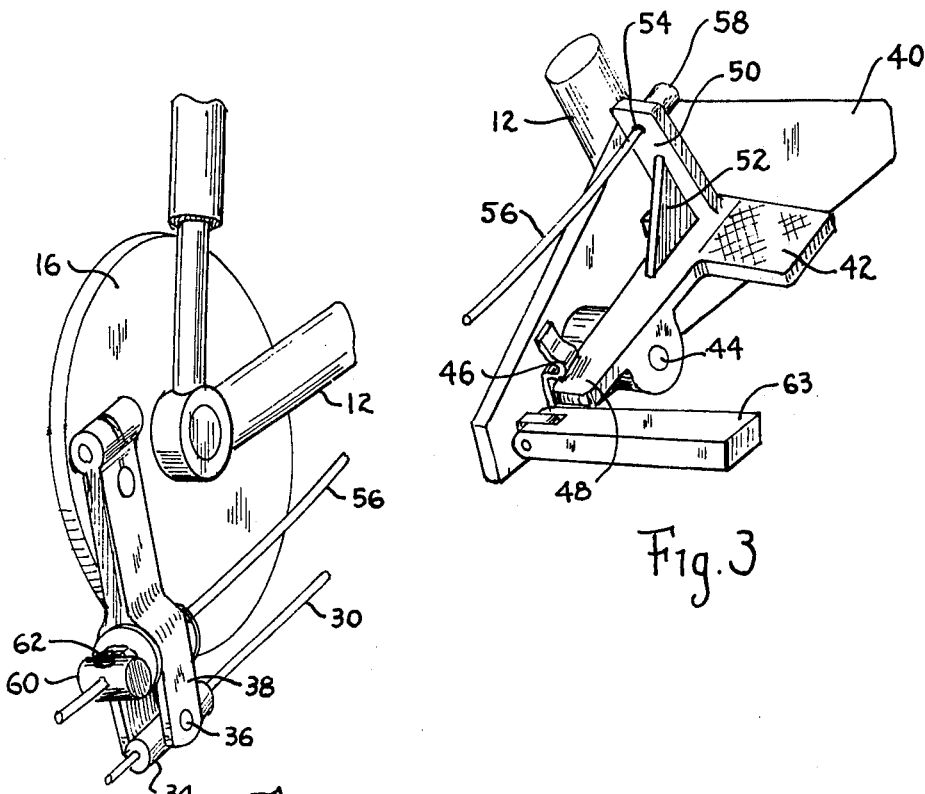
Fig. 2
Fig. 3

DUAL CONTROL SYSTEM FOR MOTORCYCLE INSTRUCTION

This application is a continuation-in-part of my co-pending application Ser. No. 382,493, filed July 25, 1973 now abandoned.

BACKGROUND OF THE INVENTION

Although dual control motor vehicles for driving instruction are well known, there is no safety device in existence for use by instructors teaching motorcycle operation.

With the great upsurge in the popularity of motorcycles, it becomes increasingly important to provide safety controls for the motorcycle instructor so that the instructor can ride in the seat behind the student motorcycle operator and be able to stop the motorcycle promptly in the event of an emergency.

It is desirable not only to brake the motorcycle in a potentially dangerous situation but also to be able to deactivate the motor and prevent the cycle from being under power after it is brought to a stop.

It is an object of the present invention to provide a safety auxiliary brake and motor control for a motorcycle which can be easily mounted on any standard motorcycle.

Another object of the present invention is to provide a detachable auxiliary brake control which has relatively few parts, yet effectively brakes the motorcycle when the same is foot-operated by the driving instructor.

A further object of the present invention is to provide a switch which is operated when the auxiliary brake pedal is depressed a given amount, the switch being capable of being reset only manually.

Another object of the present invention is to provide an adjustment means on the auxiliary brake cable for altering the braking response of the device.

A further object of the present invention is to provide a complete dual control motorcycle for instruction purposes in which the instructor cannot only brake the motorcycle and make the engine inoperative but may also steer, shift, and accelerate the vehicle.

Still another object of the present invention is to provide a separate seat for the motorcycle instructor that is elevated to an extent whereby the instructor's visibility is not impaired or prevented by the student seated forward of the instructor.

Another object of the present invention is to provide dual handlebars operatively connected to a common steering mechanism in which the motion transmitting means between the handlebars are elongated connecting rods that can be adjusted as to their effective length.

The invention will now be more fully described with reference to the accompanying drawings in which:

FIG. 1 is a partial side elevational view of a motorcycle with the safety auxiliary braking device mounted thereon to the rear of the conventional motorcycle operator's brake;

FIG. 2 is a partial perspective view of the motorcycle brake having both the standard motorcycle brake cable and auxiliary brake cable;

FIG. 3 is a perspective view of the safety auxiliary brake assembly for a motorcycle constructed in accordance with the teachings of the present invention;

DESCRIPTION OF THE PREFERRED EMBODIMENTS OF THE INVENTION

Figure 4:
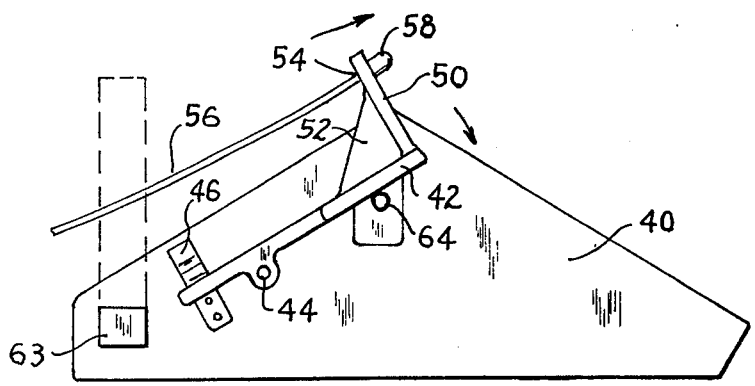
FIG. 4 is a side elevational view of the structure shown in FIG. 3.

Referring to FIG. 1, a motorcycle, referred to generally by the numeral 10, is shown having a frame 12 and a rear wheel 14. A braking disc 16 is illustrated as mounted on the axle 18 of the rear wheel 14.

It will be noted that a standard motorcycle operator's brake pedal 20 is shown pivotally mounted at 22 to the frame 12. The pedal 20 is normally maintained in an inoperative position by means of a return spring 24. The pedal 20 is provided with an upstanding plate 26 having a hole 28 through which the main flexible brake cable 30 passes, having a headed end 32. The other end of brake cable 30, as seen in FIG. 2, is provided with a fitting 34 which is pinned at 36 to the U-shaped brake actuator member 38.

Referring now to the inventive embodiment, a triangular-shaped mounting plate 40 is shown secured to the motorcycle frame 12 in any suitable manner. An auxiliary brake pedal 42 is swingably mounted on the plate 40 by means of a pivot 44. A spring 46 bears lightly on the end 48 of the auxiliary brake assembly remote from the pedal 42 in order to gently force the pedal 42 upwardly and thereby maintain the latter in an inoperative position when not in use. The auxiliary pedal 42 is provided with an upstanding plate 50 and a reinforcing web 52. The plate 50 is provided with an opening 54 through which a normally slack, flexible auxiliary cable 56 passes. The end of the cable 56 adjacent to the plate 50 is provided with a headed member 58. Referring to FIG. 2, it will be noted that the other end of auxiliary brake cable 56 is provided with a locking cylinder 60 having a set screw 62 for selectively tightening or loosening the auxiliary cable 56.

A foot rest 63 is pivotally attached to the rear of the mounting plate 40, and as seen in FIG. 4, may be kicked upwards and out of the way when the motorcycle 10 is not being used.

Figure 5:
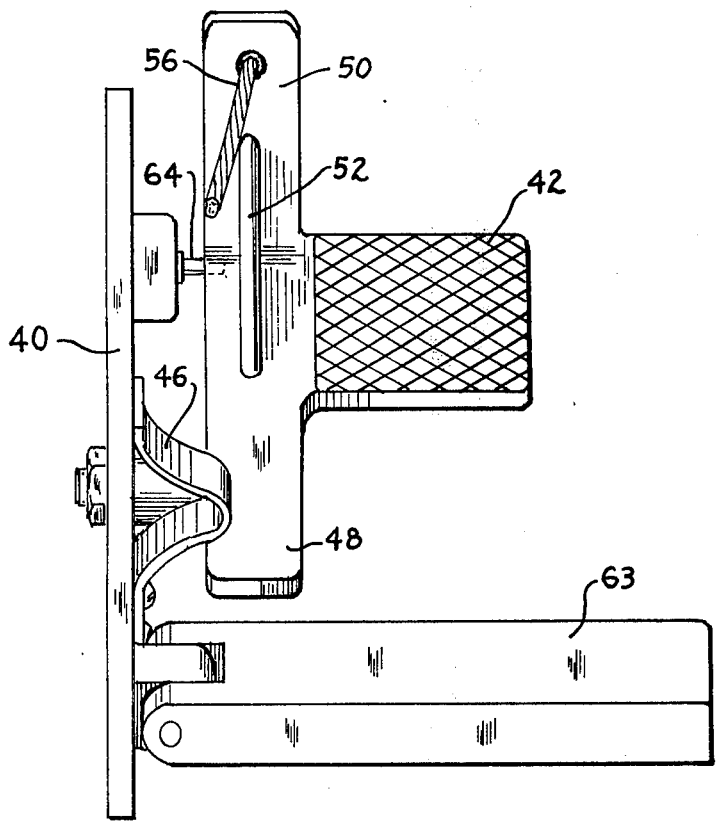
FIG. 5 is an enlarged top plan view of the safety auxiliary brake assembly for a motorcycle shown in FIG. 4.

As seen in FIGS. 4 and 5, a toggle switch 64 is shown which is operated by the undersurface of the auxiliary foot pedal 42 when the pedal is depressed a predetermined distance. The switch 64 is connected to the motor ignition in a manner well known in the art, and cuts off the ignition when depressed thereby rendering the motor inoperative, preventing an accidental start-up of the motorcycle engine after the machine has been braked by the auxiliary brake pedal 42. The switch 64 will remain inoperative and must be manually reset. It should be apparent that although the use of an engine cut-off switch such as described hereinabove is desirable, it is not absolutely necessary to have the switch with the present novel auxiliary braking device.

Figure 6:
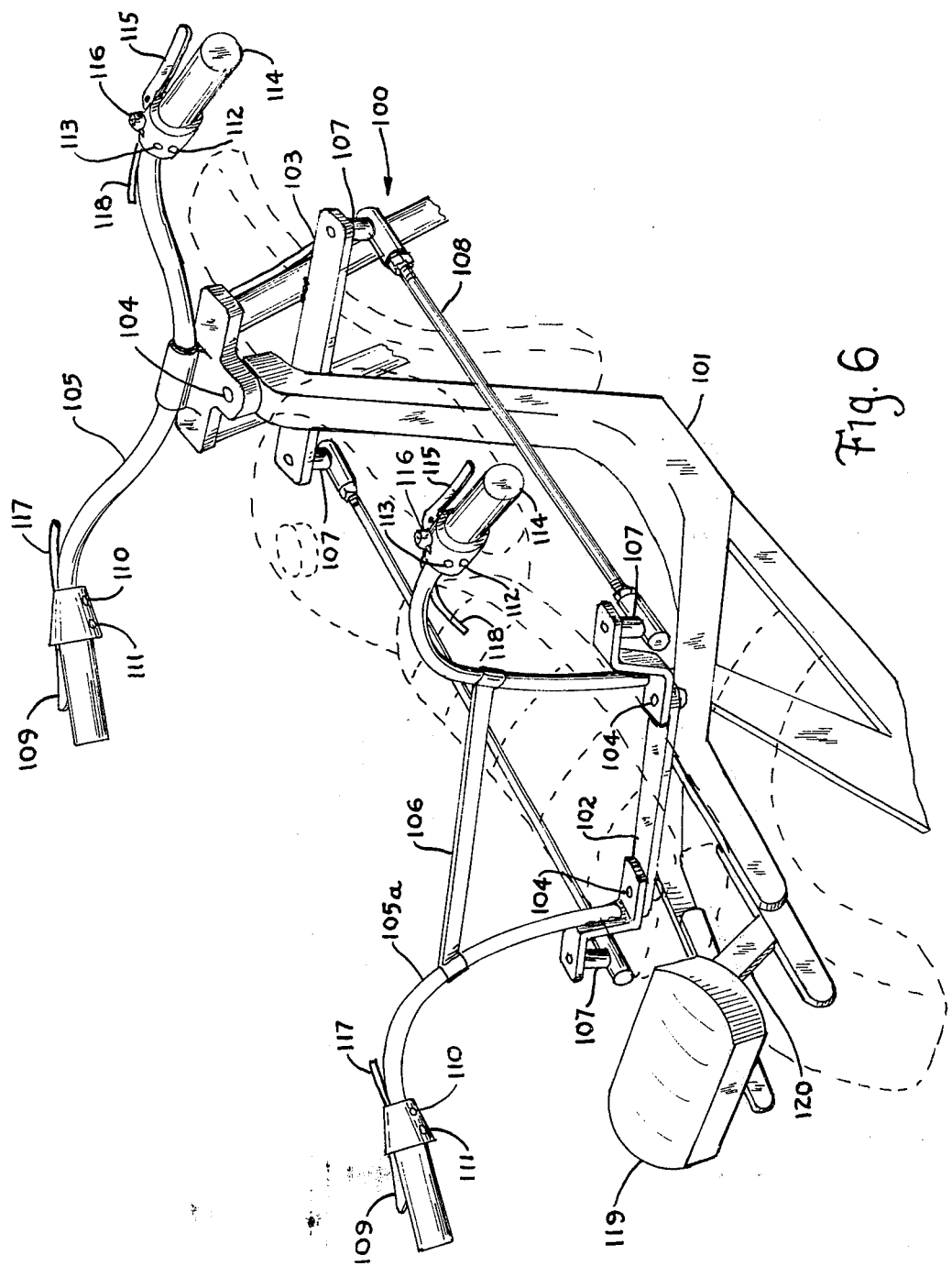
FIG. 6 is a perspective view of an alternative construction showing some of the essential elements of the auxiliary operating and control devices for an instructional motorcycle.

Referring to FIG. 6, a construction is illustrated embodying the principles of the present invention in which a steering mechanism is shown and referred to generally by the numeral 100 having interconnected front and rear handlebars 105 and 105a, respectively, mounted on a frame 101. The front handlebars 105 are mounted by a pivot 104 on the frame 101. A front bracket 103 is welded or otherwise secured to the forks of the steering mechanism 100. A rear bracket 102 is also welded to the frame 101 and is provided with pivots 104 to which the handlebar assembly 105 is mounted. The rear handlebars 105 are connected to the steering mechanism 100 by means of a pair of elongated connecting rods 108 that are adjustable in length and are provided with ball swivel joints 107 at the ends thereof. The rear handlebar 105a is further provided with a reinforcing brace 106. Both the handlebars 105 and 105a additionally mount a clutch lever 109, a horn button 110, a signal light actuating button 111, a starter button 112, and a control button 113 for the motorcycle lights, as well as an ignition cut-off switch button 116.

The throttle grip 114 is of the standard type and front brakes for the vehicle are controlled by hand levers 115 on both the front and rear handlebars. A clutch cable 117 is shown secured to the left hand handlebar grip of each handlebar while the brake cable 118 is affixed to the right hand handlebar grip of each handlebar.

Located to the rear of the motorcycle frame 101 is a seat bracket 120 to which is secured a separate instructor's seat 119 that is positioned at a higher elevation than the operator's seat. This elevated seat permits the instructor to observe the road ahead of the motorcycle without having his vision blocked by the student seated ahead of him.

Figure 7:
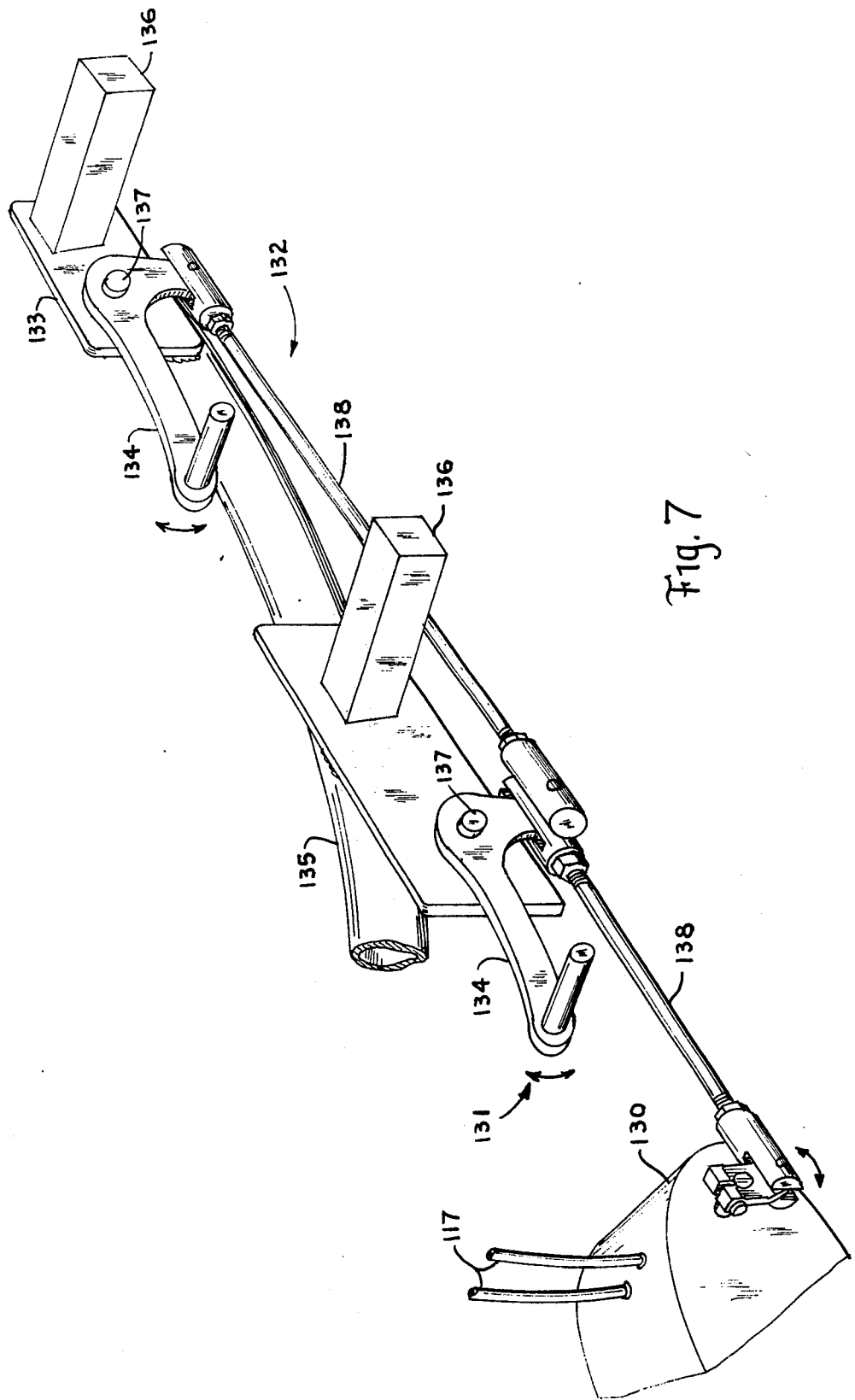
FIG. 7 is a perspective view, on enlarged scale, of the clutch arrangement and associated structure constructed in accordance with the teachings of the alternative embodiment of the present invention.

As seen in FIG. 7, the clutch cables 117 pass into a clutch housing 130, and either of these cables operates the clutch (not shown) mounted in the housing 130. The reference numeral 131 shows the operator's shift lever and rod while the reference numeral 132 illustrates the additional shift, or the instructor's shift lever, which is interconnected to the operator's shift lever as well as the clutch itself through adjustable rods 138. The additional bracket 133 is secured to the part 135 of the frame 101. The shift foot levers 134 are pivoted about pivot points 137 when it is desired to upshift or downshift the motorcycle engine. Furthermore, foot rests 136 are fixed to additional brackets 133 and 133a that are rigidly connected to the motorcycle frame 101. In the usual manner, either of the clutch levers 109 are squeezed in order to engage the clutch when it is desired to shift, and either of the foot levers 134 are engaged by the foot of the operator or instructor in order to perform the desired shifting of the motorcycle engine.

The safety feature of the auxiliary braking device for motorcycles described above should be apparent and motorcycle instructors will now have the same measure of control over the motorcycle when instructing novice operators that automobile driving instructors have over their dual control automobiles when they are engaging in the teaching of new drivers in the techniques of driving. It will be noted from observing FIG. 6 that the instructor has full control of the motorcycle when teaching the student the fundamentals of operating the same, including the ability to steer the vehicle independent of the student, and to shift as well as to apply the brakes to the vehicle.

What is claimed is:

1. In a braking system and a motor control for a motorcycle having a main pedal operated brake assembly including a main brake cable or rod operatively connected to a rear wheel braking device; the invention comprising a combination auxiliary safety brake and a motor control device, said auxiliary safety brake including an auxiliary brake pedal mounted rearward of the main brake pedal and adapted to be operated by a rider sitting behind the motorcycle operator, an auxiliary brake cable having normally more slack than said main brake cable and being responsive to the movement of said auxiliary brake pedal and additionally operatively connected to said rear wheel braking device but being arranged to be inoperative when said main brake pedal is actuated and being operative when the rider presses down on the auxiliary brake pedal to pull the auxiliary brake cable thereby braking the motorcycle independently of the operation of the main brake pedal, means for adjusting the looseness of said auxiliary brake cable, and a resettable ignition switch for the motorcycle engine being mounted in the path of movement of said auxiliary brake pedal and capable of being reset only manually, said auxiliary brake pedal being so mounted and constructed to operate the switch and render said engine inoperative after the auxiliary brake pedal is pressed down a predetermined distance thereby stopping the operation of the engine.

2. The invention as claimed in claim 1 wherein said ignition switch is a toggle switch.

3. The invention as claimed in claim 1 wherein said auxiliary pedal is pivotally mounted to the motorcycle.

4. The invention as claimed in claim 3 further comprising a mounting plate for said auxiliary brake pedal, a spring on said mounting plate for retaining the auxiliary brake pedal in a normal position in which the auxiliary brake cable is not pulled, the auxiliary brake pedal being pivotable downwardly against the force of said spring to thereby pull said auxiliary brake cable and brake said rear wheel.

5. The invention as caimed in claim 1 further comprising a brake actuator member operatively connected to said rear wheel braking device, and both said main brake cable and auxiliary brake cable being connected to the brake actuator member.

6. In a dual control system for a motorcycle having a steering mechanism, a front handlebar, a main brake assembly including a main brake means operatively connected to a rear wheel braking device, the invention comprising a rear handlebar, motion transmitting means permanently and operatively connecting the rear and front handlebars, an auxiliary safety brake including an auxiliary brake means and adapted to be operated by an instructor sitting behind the motorcycle operator, an auxiliary brake cable responsive to the movement of said auxiliary brake means and additionally operatively connected to said rear wheel braking device but being arranged to be inoperative when said main brake means is actuated and being operative when the instructor applies a force to the auxiliary brake means to cause movement of the auxiliary brake cable thereby braking the motorcycle independently of the operation of the main brake means, separate ignition cut-off switches operative by either operator or instructor to render the motor inoperative, an operator's seat and an additional rear seat, and means mounting said rear seat at an elevation sufficiently above the plane of said operator's seat to afford the instructor better visibility of the road ahead.

7. The dual control system for a motorcycle as claimed in claim 6 wherein said motion transmitting means are a pair of elongated connecting rods, said rods being provided with means for changing the effective length thereof.

* * * * *